United States Patent [19]

Jeon

[11] Patent Number: 5,200,813
[45] Date of Patent: Apr. 6, 1993

[54] CONTROL METHOD FOR WHITE BALANCE OF VIDEO CAMERA

[75] Inventor: Byeong G. Jeon, Suweon-city, Rep. of Korea

[73] Assignee: Samsung Electronics Co., Ltd., Suwon, Rep. of Korea

[21] Appl. No.: 661,015

[22] Filed: Feb. 26, 1991

[30] Foreign Application Priority Data

Feb. 28, 1990 [KR] Rep. of Korea .................... 90-2655

[51] Int. Cl.$^5$ .................... H04N 9/73; H04N 9/07
[52] U.S. Cl. .................... 358/29; 358/41
[58] Field of Search .................... 358/41, 43, 44, 29, 358/29 C, 909

[56] References Cited

U.S. PATENT DOCUMENTS

| 4,679,067 | 7/1987 | Belmares-Sarabia | 358/29 |
| 4,814,864 | 3/1989 | Pritchard | 358/29 C |
| 4,851,897 | 7/1989 | Inuma | 358/29 C |
| 5,016,091 | 5/1991 | Choi | 358/29 C |

Primary Examiner—James J. Groody
Assistant Examiner—Sherrie Hsia
Attorney, Agent, or Firm—Robert E. Bushnell

[57] ABSTRACT

The invention provides a control method for white balance of video with a storing process and a producing process wherein the address indicated according to a value of the photographed place and optical filter is stored and produced. The exact automatic white balance control is possible by performing address indication according to the photographed place and optical filter, storing process and producing process of white balance even in case that the optical filter condition is changed.

3 Claims, 3 Drawing Sheets

CONTROL METHOD FOR WHITE BALANCE OF VIDEO CAMERA

BACKGROUND OF THE INVENTION

The present invention relates to a control method for a video camera, and more particularly to, a control method for controlling white balance in dependence upon the value of an optical filter by a photographed place and the optical filter.

In general, a scene is photographed after controlling the white balance in a conventional video camera. The white balance is automatically controlled by an optical filter absorbed by color temperature and influenced by the amount of light conditioning the illumination at the place where the scene is to be photographed.

Accordingly, the conventional video camera has following features;

A. automatic white balance terminal, indoor selection switch, outdoor selection switch B. three types of optical filters which respectively absorb color temperatures of 3,200° K., 5,600° K., 5,600° K.+¼ND, wherein the symbol ND (neutral density) is a unit for expressing a relative transmittance of a certain filter against the transmittance of a filter which has no wavelength preference for visible light, and 5,600° K.+¼ND is used in the condition of strong color temperature for photographing a scene covered with snow.

Using the indoor and outdoor selection switch, it is possible to control the white balance appropriately to the circumstance without adjusting automatic white balance whenever moving in and out of a building.

Meanwhile, the optical filter is influenced by the place where the picture is taken because the color temperature varies approximately from 3,200° K. indoor to 5,600° K. outdoor. The photographed place matching to the white balance and the condition of the optical filter can be displayed by an on-screen display function of the video camera. However, there is a problem that the automatic white balance should be controlled once more time in case that the optical filter is changed because the automatic white balance is set only by the condition of the photographed place.

SUMMARY OF THE INVENTION

The present invention has an object to provide the control method for white balance which takes advantage of both conditions of the optical filter and the photographed place simultaneously for setting an automatic white balance so that the white balance can be controlled without any additional setting even in case that the status of the optical filter is changed.

This method can be achieved by storing and producing controlled white balance values into an address indicated by the photographed place and the optical filter, when setting the condition to the automatic white balance in a microcomputer (MICOM).

According to the present invention, there is provided a white balance control method comprising: a storing process to store a white balance value controlled by the white balance control into the address indicated according to a value of the photographed place and the optical filter; and a producing process to produce the controlled white balance value stored by the storing process for white balance from a memory selection key selecting white balance according to a value of the photographed place and the optical filter.

BRIEF DESCRIPTION OF THE DRAWINGS

These and other objects, features, and advantages of the present invention will become more apparent from the following description for the preferred embodiments taken in conjunction with the accompanying drawings, in which.

DETAILED DESCRIPTION OF THE PREFERRED EMBODIMENT

The present invention will be now described in more detail with reference to the accompanying drawings.

Figure 1:
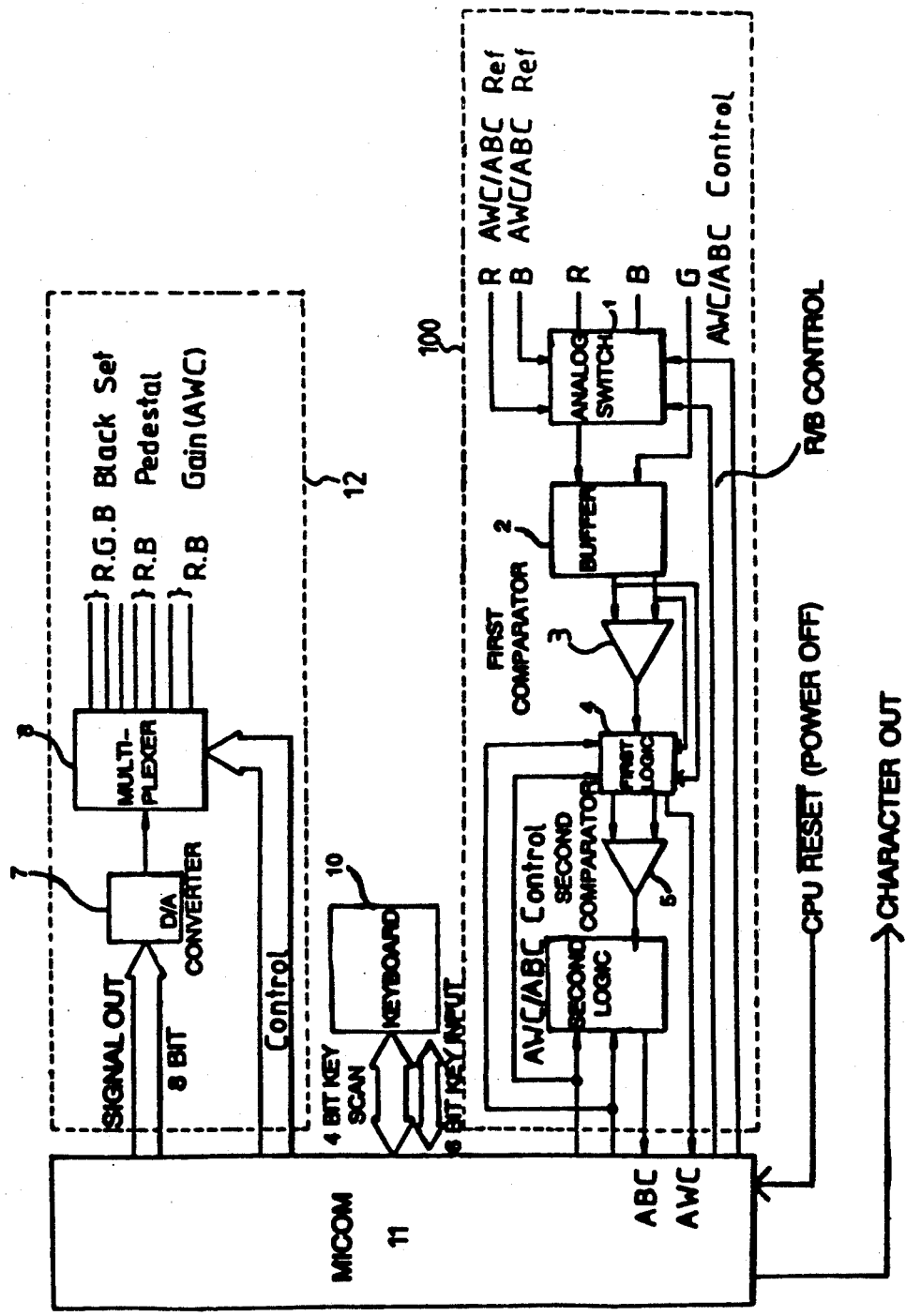
FIG. 1 is a detailed circuit diagram representing a white balance control circuit according to a video camera of the present invention.

FIG. 1 provides a combination means 100 to control white and balance combining R(red), G(green), B(Blue) signal inputs, a keymatrix 10 to select a control mode, a MICOM 11 to control the white and the balance with an automatic white control signal AWC and an automatic balance control signal ABC produced by the combination means 100 and a selection signal produced by the keymatrix 10, and a white balance output circuit 12 producing white balance controlled by the MICOM 11.

The combination means 100 comprises an analog switch 1 for selecting an input signal R or B in accordance with reference signal, either a R reference signal or a buffer block 2 for rectifying either the R or the B signals coming from the analog switch 1 and the input signal G, a first comparator 3 for comparing either the R or B and the G signals from the buffer block 2, a first logic block 4 for producing the automatic white control signal AWC by combining either the R or the B and the G signals from the buffer block 2 in accordance with an output signal coming from the first comparator 3, a second comparator 5 for comparing the output signals of a first logic block 4, and a second logic block 6 for producing the automatic balance control signal ABC by combining either the R or the B and the G signals coming from the buffer block 2 in accordance with an output signal coming from the second comparator 5.

That is, the buffer 2 rectifying the R or the B signals selected by the analog switch 1 and the input signal G is connected to the output terminal of the analog switch 1 which selects the R or the B signals in accordance with one of the R and the B reference signals. The first comparator 3 producing the automatic white control driving signal by comparing either the R or the B and the G signals is connected to an output terminal of the buffer block 2. In the meantime, an automatic white control-driving signal produced by the first comparator 3 has a level of high or low. The first logic block 4 producing the automatic white control signal AWC by combining the G signal and either the R or the B signals coming from the buffer block 2 according to the output signal of the first comparator 3 is connected to an output terminal of the first comparator 3.

Also, the second comparator 5 producing the automatic balance control-driving signal by comparing the signals coming from the first logic block 4 is connected to an output terminal of the first logic block 4. In the meantime, the automatic balance control-driving signal produced by the second comparator 5 has a level of high or low.

Then, the second logic block 6 producing the automatic balance control signal ABC by combining either the R or the B and the G signals coming from the buffer block 2 according to the automatic balance control-driving signal coming from the second comparator 5 is connected to an output terminal of the second comparator 5.

The key matrix 10 comprises indoor and outdoor selection keys which set the value of the white balance controlled in the automatic white balance according to indoor and outdoor, a memory selection key for selecting each optical filter according to indoor and outdoor, and an automatic white balance selection key for controlling the white balance automatically.

The MICOM 11 controlling the white balance by means of the output signal of the combination means and the signal selected by the keymatrix 10 which includes a RAM(Random Access Memory) for storing the value of the white balance control. The MICOM 11 has a program which stores and controls the value of the automatic white balance during the interval of the vertical retrace as described in FIG. 2.

Figure 2:
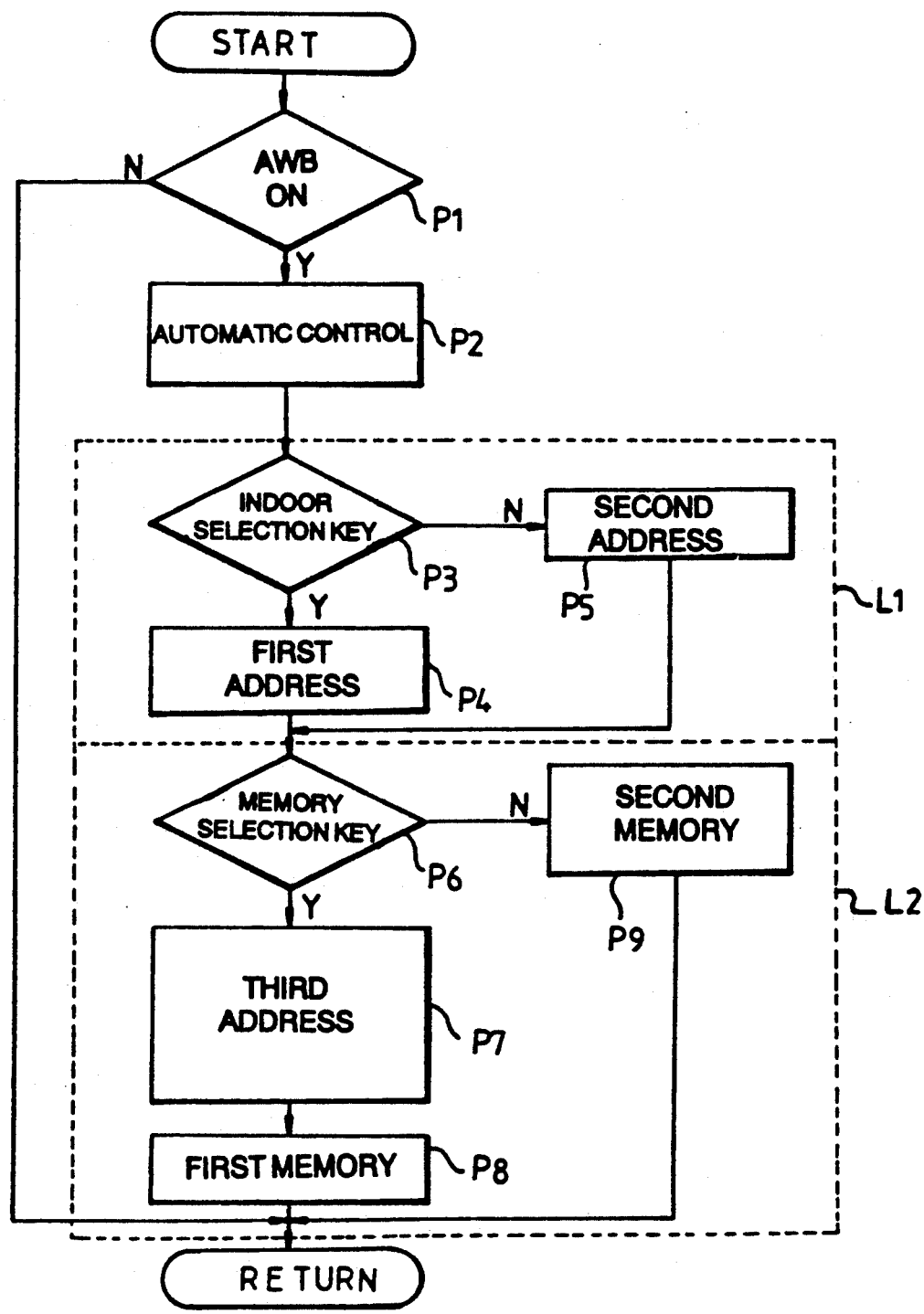
FIG. 2 is a flowchart representing a white balance storing process for storing the white balance value controlled by a MICOM in the white balance control circuit.

Meanwhile, the program stored in the MICOM 11 is executed during every vertical blanking period. The program stored in the MICOM 11 as shown in FIG. 2 includes a first key input decision step P1 which decides whether an automatic white balance key is turned on when a vertical blanking pulse is applied during vertical blanking period, a conventional automatic control process P2 for the white balance which controls white balance automatically, and a storing and producing process for the white balance which stores and produces the value of the white balance controlled by the conventional automatic control process P2 for the white balance. In that case, the conventional automatic control process P2 for the white balance is executed similarly to a conventional way.

A storing process for white balance which stores the value controlled by the automatic control method for white balance comprises a first address indication routine L1 for indicating a predetermined address according to a photographed place, and a second address indication routine L2 for indicating the address of which value is the result of adding the address indicated by the first address indication routine L1 to the value of the optical filter multiplied by two at the controlled automatic white balance value.

In this process, the first address indication routine L1 comprises a second key input decision step P3 which decides whether the controlled automatic white balance data is resulted from the indoor selection key, a first address indication step P4 which indicates the address used in case that the indoor selection key is selected at the second input decision step P3, and, a second address indication step P5 which indicates the address used in case that the outdoor selection key is selected.

The second address indication routine L2 comprises a third key input decision step P6 which decides whether the memory selection key of the keymatrix 10 is turned on, a third address indication step P7 which indicates the address by the result of adding the address value indicated according to the photographed place to the value of the optical filter multiplied by two if the turning on of the memory selection key is recognized at the third key input decision step P6, a first storing step P8 which stores the controlled white balance data into the address indicated by the third address indication step P7, and a second storing step P9 which stores the white balance data into the address indicated according to the photographed place if the turning on of the memory selection key is not recognized at the third key decision step P6.

Figure 3:
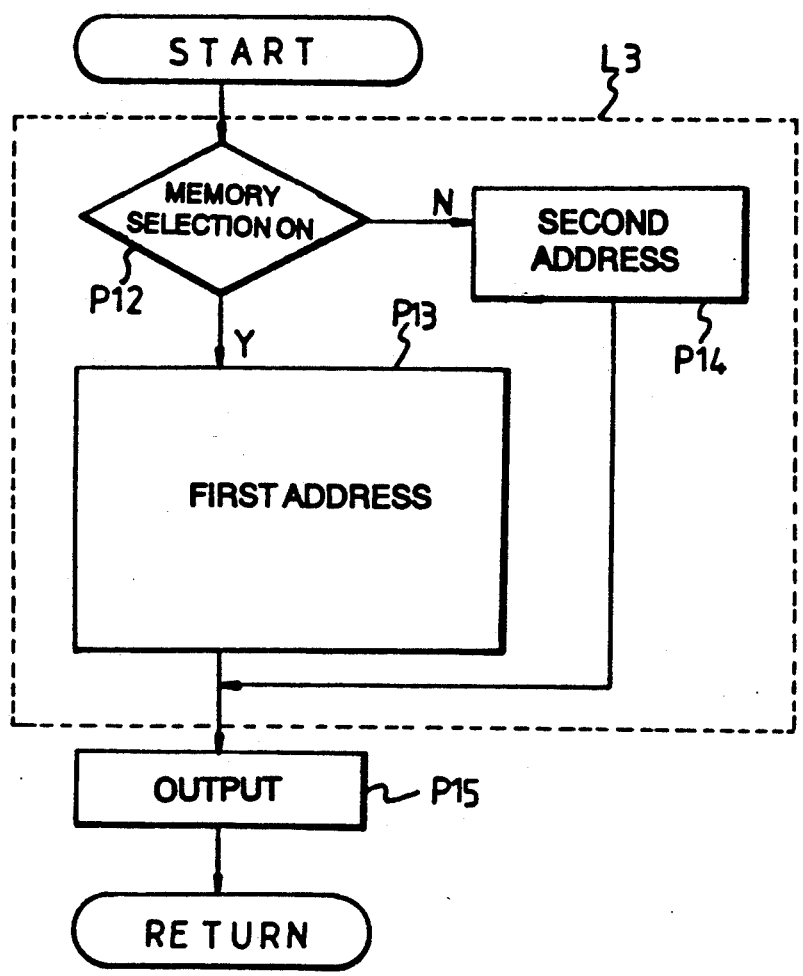
FIG. 3 is a flowchart representing a white balance producing process for producing the white balance value stored by the MICOM in the white balance control circuit.

The producing process for white balance, as shown in FIG. 3 producing the data stored by the storing process for white balance, comprises an address detection routine L3 which detects the address storing data by the memory selection key of the keymatrix 10, and an output step P15 which produces the data at the address detected by the address detection routine L3.

The address detection routine L3 comprises a fourth key input decision step P12 which decides whether the memory selection key of the keymatrix 10 is turned on, a first address detection step P13 which detects the address indicated by the photographed place and the optical filter when the memory selection key of the keymatrix 10 is turned on, and a second address detection step P14 which detects the address indicated by the photographed place when the memory selection key of the keymatrix 10 is not turned on.

The white balance output circuit 12 as shown in FIG. 1 is connected to an output terminal of MICOM 11 in order to process the output data controlled by the MICOM 11.

The white balance output circuit 12 comprises a digital/analog converter 7 which converts eight-bit output data into analog signals and a multiplexer 8 which is connected to the digital/analog converter 7 so as to produce a selection signal among the analog signals coming from the digital/analog converter 7. Also, an on-screen displayer is installed in the MICOM 11, which displays conditions after controlling the white balance with the output data by the keymatrix 10.

In such a circuit arrangement according to the present invention, one of the R and B signal can be selected by the reference signals of R and B by applying the R and B input signals as shown in FIG. 1 into the analog switch 1.

The selected R or B and G signal inputs are applied to the buffer block 2 to be rectified, which is connected to the rear end of the analog switch 1.

The R or B and G signals rectified by the buffer block 2 are applied to the first comparator block 3 for producing an automatic white control-driving signal the result of comparing R or B and G signals. In this case, if the output of the first comparator 3 is a high level signal, the automatic white control driving signal AWC is produced from the buffer blocks by combining R or B and G signals which are applied to the first logic block 4 connected to the output terminal of the buffer block 2.

On the other hand, the automatic balance control-driving signal is produced after applying the signal produced by the first logic block 4 into the second comparator block 5 connected to the rear end of the first logic block 4. Then, if the automatic balance control-driving signal produced by the second comparator 5 is a high level signal, this high level signal is applied to the second logic block 6 connected to the output terminal of the buffer block 2 so that either the R or the B and the G signals produced by the buffer block 2 can be combined; and the automatic balance control signal ABC is produced.

The automatic white control signal AWC and the automatic balance control signal ABC generated by the combination means as shown in FIG. 1 are applied to the MICOM 11 when the automatic white balance selection key of the keymatrix 10 is turned on.

That is, when the vertical blanking pulse is applied to the MICOM 11, it is decided whether the automatic white balance selection key in the keymatrix 10 is turned on or not by the first key input decision step P1 as described in FIG. 2.

If the automatic white balance selection key is turned on by the first key input decision step P1, the automatic white control signal AWC and the automatic balance control signal ABC generated by the combination means as shown in FIG. 1 are provided into the MICOM 11, and consequently, the data is produced by the conventional automatic control process for white balance in the MICOM 11.

The data controlled by the control method for the automatic white balance is stored by the storing process for the white balance. The data from the conventional automatic control process for white balance is applied to the second key input decision step P3 of the first address indication routine L1 in the storing process for white balance, and then, the input key is decided.

If the input key is decided to be the indoor selection key by the second key input decision step P3, the address which is pointed in case of the indoor key is indicated by the first address indication step P4. However, if the input key is decided to be the outdoor selection key by the second key decision step P3, multiple addresses which are pointed in case of the outdoor key are indicated by the second address indication step P5. The first address is indicated by an input key out of the two indoor and outdoor selection keys.

After indicating the address by the first address indication routine L1, the second address is indicated by the second address indication routine L2 according to the memory selection key of the keymatrix 10.

That is, the third key input decision step P6 decides whether the memory selection key is turned on after the first address indication routine L1. If the third key input decision step P6 decides that the key input is a memory selection key, the value which is the result of adding the address indicated in the first address indication routine L1 to the value of the optical filter multiplied by two becomes the data address indicated by the photographed place.

The above automatic white balance control data is stored by the first storing step P8 into the address indicated by the third address indication step P7 prior to returning to an original state of the storing process of an automatic white balance control data. Similarly, if the automatic white balance selection key is not turned on in the first key input decision step P1, the MICOM 11 automatically returns to its original state of the storing process of the automatic white balance control date.

In the meantime, if the third key input decision step P6 recognizes that the key input is not a memory selection key, the second storing step P9 stores the controlled automatic white balance data into the address indicated by the first address indication routine L1.

The data stored in the MICOM 11 by the storing process for white balance is produced by the memory selection key of the keymatrix 10 as described in FIG. 3. The fourth key input decision step P12 decides whether the memory selection key of the keymatrix 10 is turned on. In this step, if the fourth key input decision step P12 decides that the key input is a memory selection key, the first address detection step P13 detects the address indicated by the photographed place and the optical filter in the storing process for the white balance.

On the contrary, if the fourth key input decision step P12 recognizes that the key input is not a memory selection key, the second address detection step P14 detects the address indicated by the photographed place in the storing process for white balance. Also, the output step P15 produces the data stored in the address which is detected by the first and second address detection steps P13 and P14. This output data produced by the output step P15 is applied to the white balance output circuit 12 connected to the rear end of the MICOM 11. The white balance control data produced by the MICOM 11 is converted into the analog signal by the digital/analog converter 7.

Subsequently, this analog signal is produced as a selected data through the multiplexer 8 connected to the rear end of the digital/analog converter 7.

As mentioned above, the automatic white balance is controlled by the vertical blanking pulse applied during the vertical blanking period, and the controlled automatic white balance data is stored in the address which is processed by the first and second address indication routines L1 and L2, where the first address indication routine L1 indicates the address according to the photographed place, and the second address indication routine L2 indicates the data address whose address value is the result of adding the value of the optical filter multiplied by two to the address indicated by the photographed place.

The data stored in the above indicated address can be used to control the white balance by the signal of the keymatrix 10 even in case that the optical filter condition is changed. Thus, the present invention has an effect of controlling white balance accurately even when the optical filter condition is changed by performing the first address indication according to the photographed place, the second address indication according to the optical filter, storing process, and producing process of white balance.

The present invention is in no way limited to the embodiment described hereinabove. Various modifications of disclosed embodiment as well as other embodiments of the invention will become apparent to persons skilled in the art upon reference to the description of the invention. It is, therefore, contemplated that the appended claims will cover any such modifications of embodiments as fall within the true scope of the present invention.

What is claimed is:

1. In a circuit including means for providing an automatic white control signal and an automatic balance control signal in dependence upon reception of a video signal representative by a plurality of color signals, a keymatrix for selecting control modes, a microcomputer for controlling automatic white balance of the video signal in dependence upon said automatic white control signal, said automatic balance control signal and said control modes, the white balance control method, comprising:

a storing process for storing automatic white balance values into addresses indicated according to values representative of illuminating conditions of an illuminated object and an optical filter;

a producing process for producing said automatic white balance values stored by said storing process to white balance said video signal according to values representative of said illuminating conditions of said illuminated object and said optical filter.

2. The white balance control method according to claim 1, wherein said storing process comprises:

a first address routine for indicating a first address having an address value corresponding to the value of said illumination conditions of said illuminated object in response to a first control mode of said keymatrix representative of one of an indoor selection mode and an outdoor selection mode; and a second address routine for indicating a second address having an address value corresponding to the result of adding the value of said optical filter multiplied by two to said first address value in dependence upon a second control mode of said keymatrix representative of a memory selection mode.

3. The white balance control method according to claim 2, wherein said producing process comprises:

an address detection routine for detecting said first address representative of said illuminating conditions of said illuminated object, and said second address representative of said illuminating conditions of said illuminated object and said optical filter in response to said second control mode, and for producing data stored in one of said first address and said second address in response to said second control mode.

* * * * *

UNITED STATES PATENT AND TRADEMARK OFFICE
CERTIFICATE OF CORRECTION

PATENT NO. : 5,200,813
DATED : 6 April 1993
INVENTOR(S) : Byeong Gwon Jeon

It is certified that error appears in the above-indentified patent and that said Letters Patent is hereby corrected as shown below:

On title page, item [75]

NAME OF INVENTOR change "Byeong G. Jeon" to --Byeong Gwon Jeon--;

Column 4, line 56, change "buffer blocks" to --buffer block 2--

Signed and Sealed this

Eighteenth Day of October, 1994

Attest:

BRUCE LEHMAN

Attesting Officer          Commissioner of Patents and Trademarks